United States Patent
Lee et al.

(10) Patent No.: US 9,894,610 B2
(45) Date of Patent: Feb. 13, 2018

(54) METHOD FOR MONITORING ON DURATIONS IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR); Youngdae Lee, Seoul (KR); Sungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 14/784,873

(22) PCT Filed: Apr. 29, 2014

(86) PCT No.: PCT/KR2014/003783
§ 371 (c)(1),
(2) Date: Oct. 15, 2015

(87) PCT Pub. No.: WO2014/181997
PCT Pub. Date: Nov. 13, 2014

(65) Prior Publication Data
US 2016/0066272 A1    Mar. 3, 2016

Related U.S. Application Data

(60) Provisional application No. 61/821,663, filed on May 9, 2013.

(51) Int. Cl.
*G08C 17/00* (2006.01)
*H04W 52/02* (2009.01)
(Continued)

(52) U.S. Cl.
CPC ... *H04W 52/0229* (2013.01); *H04W 52/0216* (2013.01); *H04W 72/042* (2013.01);
(Continued)

(58) Field of Classification Search
CPC .......... H04W 52/0229; H04W 76/046; H04W 76/048; H04W 72/042; H04W 52/0216; H04B 7/2656
See application file for complete search history.

(56) References Cited

U.S. PATENT DOCUMENTS 9,635,616 B2 * 4/2017 Makharia ............ H04W 52/028
2010/0197316 A1   8/2010 Aoyama et al.
(Continued)

OTHER PUBLICATIONS

Alcatel-Lucent Shanghai Bell, et al., "Supporting Extended Long DRX Cycle for Idle Mode MTC Device Power Saving," 3GPP TSG RAN WG2 Meeting #81bis, R2-131343, Apr. 2013, 4 pages.
(Continued)

*Primary Examiner* — Clemence Han
(74) *Attorney, Agent, or Firm* — Lee, Hong, Degerman, Kang & Waimey

(57) ABSTRACT

The present invention relates to a wireless communication system. More specifically, the present invention relates to a method and a device for monitoring On Durations in the wireless communication system, the method comprising: receiving DRX information and indicator for selecting On Durations to be used for the UE; calculating one or more first On Durations in a DRX cycle based on the DRX information; and monitoring one or more second On Durations among the one or more first On Durations based on the indicator, wherein each On Duration comprises one or more subframes.

16 Claims, 10 Drawing Sheets

(51) Int. Cl.
  *H04W 72/04* (2009.01)
  *H04W 76/04* (2009.01)
  *H04B 7/26* (2006.01)
(52) U.S. Cl.
  CPC ....... *H04W 76/046* (2013.01); *H04W 76/048* (2013.01); *H04B 7/2656* (2013.01); *Y02B 60/50* (2013.01)

(56) References Cited

U.S. PATENT DOCUMENTS

| | | | |
|---|---|---|---|
| 2011/0164583 A1 | 7/2011 | Kim | |
| 2011/0199910 A1 | 8/2011 | Oh et al. | |
| 2012/0300655 A1* | 11/2012 | Lee | H04W 24/00 370/252 |
| 2013/0107782 A1 | 5/2013 | Anas et al. | |
| 2013/0114483 A1* | 5/2013 | Suzuki | H04W 76/048 370/311 |
| 2013/0176873 A1* | 7/2013 | Ji | H04W 52/0283 370/252 |
| 2013/0242833 A1* | 9/2013 | Ahn | H04W 72/082 370/311 |
| 2014/0112221 A1* | 4/2014 | Verger | H04W 52/0216 370/311 |
| 2015/0003311 A1* | 1/2015 | Feuersaenger | H04W 52/0225 370/311 |
| 2015/0201375 A1* | 7/2015 | Vannithamby | H04W 24/04 370/311 |
| 2015/0201456 A1* | 7/2015 | Lee | H04W 76/048 370/311 |
| 2015/0208461 A1* | 7/2015 | Lee | H04W 76/048 370/311 |
| 2016/0029309 A1* | 1/2016 | Kim | H04W 52/0258 370/311 |
| 2016/0057805 A1* | 2/2016 | Eriksson | H04W 52/0209 370/280 |
| 2016/0080131 A1* | 3/2016 | Terry | H04L 5/001 370/311 |

OTHER PUBLICATIONS

PCT International Application No. PCT/KR2014/003783, Written Opinion of the International Searching Authority dated Aug. 11, 2014, 9 pages.

* cited by examiner

FIG. 3
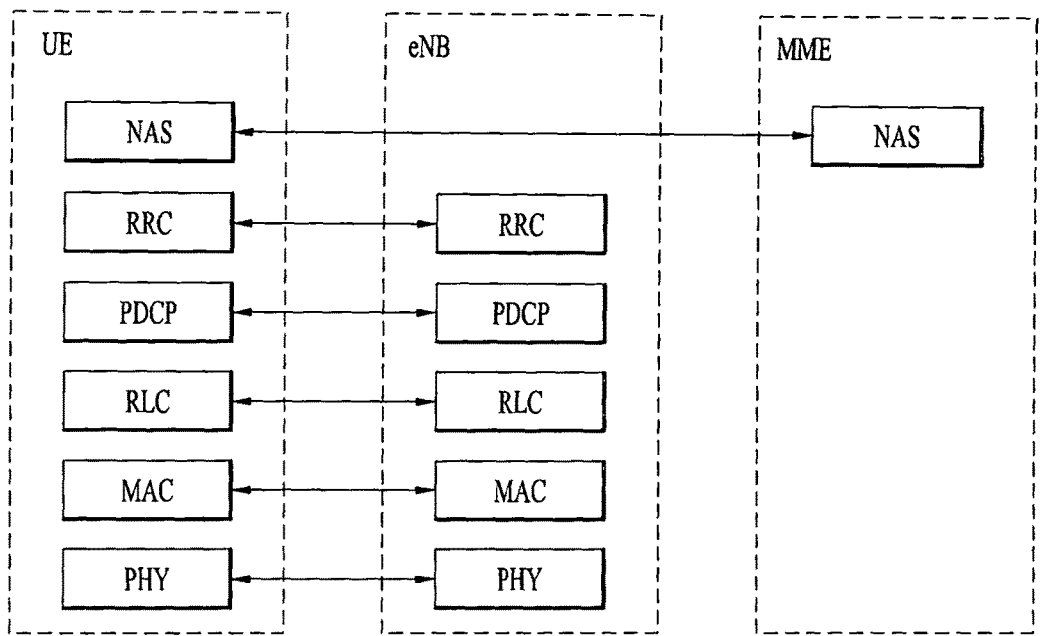
(a) Control-Plane Protocol Stack
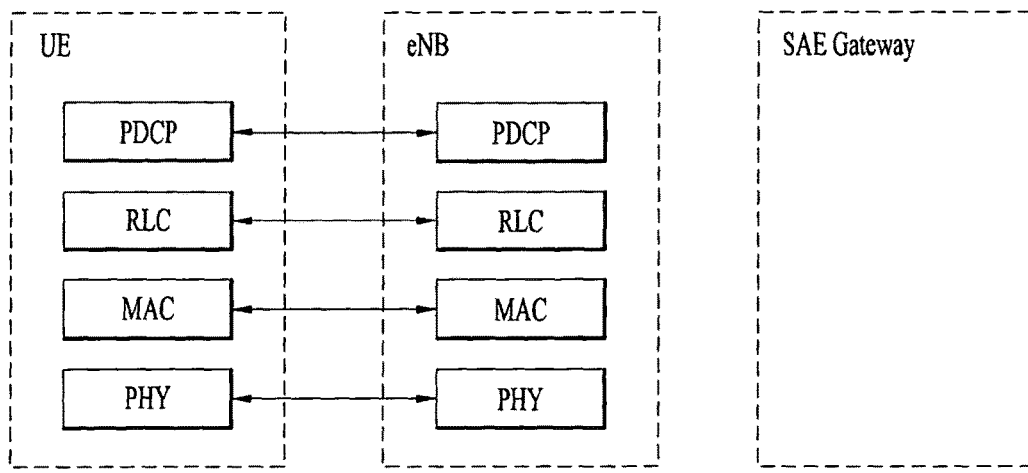
(b) User-Plane Protocol Stack (a) when the length of DRX cycle is shorter than the maximum value of SFN (max x>N)

(b) when the length of DRX cycle is shorter than the maximum value of SFN (max x<N)

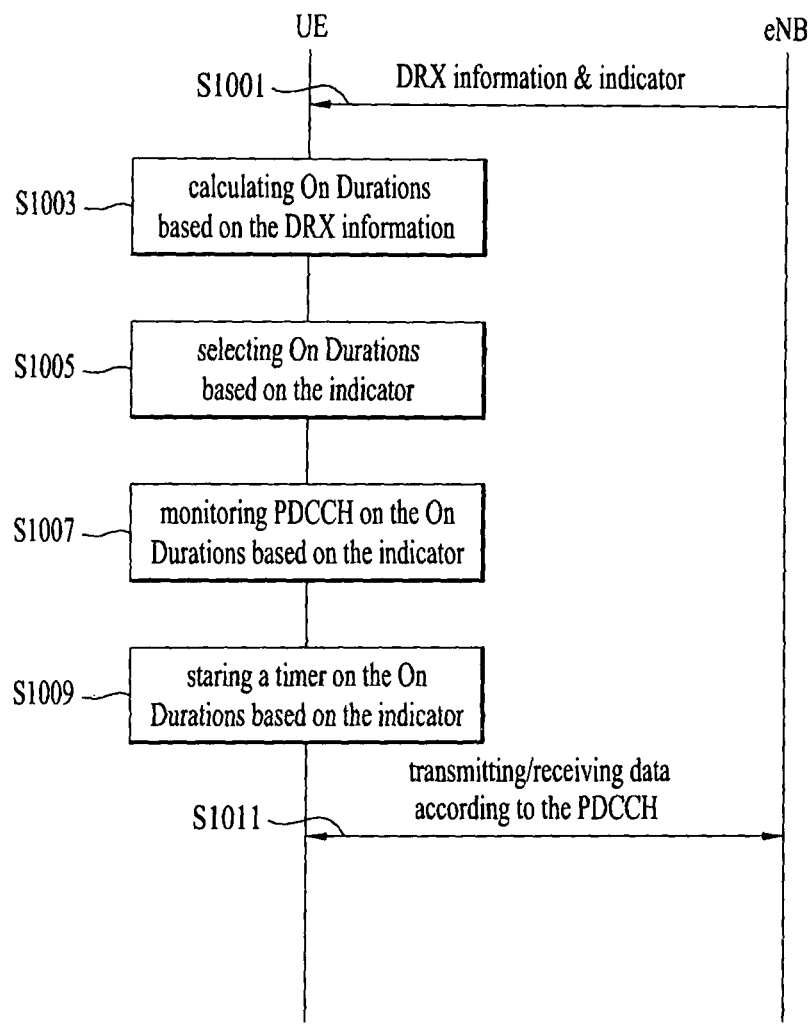

METHOD FOR MONITORING ON DURATIONS IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2014/003783, filed on Apr. 29, 2014, which claims the benefit of U.S. Provisional Application No. 61/821,663, filed on May 9, 2013, the contents of which are all hereby incorporated by reference herein in their entirety.

TECHNICAL FIELD

The present invention relates to a wireless communication system and, more particularly, to a method for monitoring On Duration in a DRX (Discontinuous Reception) operation and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications Sykem (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for monitoring On Duration in a DRX operation in a wireless communication system. The technical problems solved by the present invention are not limited to the above technical problems and those skilled in the art may understand other technical problems from the following description.

Technical Solution

The object of the present invention can be achieved by providing a method for operating by an user equipment (UE) in wireless communication system, the method comprising; receiving DRX information and an indicator for selecting On Durations to be used for the UE; calculating one or more first On Durations in a DRX cycle based on the DRX information; and monitoring one or more second On Durations among the one or more first On Durations based on the indicator, wherein each On Duration comprises one or more subframes.

In another aspect of the present invention, a method for a base station (BS) operating in a wireless communication system, the method comprising: transmitting DRX information and an indicator for selecting On Durations to be used for a user equipment (UE); and transmitting Physical Downlink Control Channel (PDCCH) signals for the one or more second On Durations, wherein the one or more second On Durations are selected among one or more first On Durations in a DRX cycle based on the indicator.

In another aspect of the present invention, provided herein is a UE (User Equipment) in the wireless communication system, the UE comprising: an RF (radio frequency) module; and a processor configured to control the RF module, wherein the processor is configured to receive DRX information and an indicator for selecting On Durations to be used for the UE, to calculate one or more first On Durations in a DRX cycle based on the DRX information, and to monitor one or more second On Durations among the one or more first On Durations based on the indicator, wherein each On Duration comprises one or more subframes.

Preferably, the one or more second On Durations are in the DRX cycle.

Preferably, said monitoring comprises monitoring one or more Physical Downlink Control Channel (PDCCH) signals for the one or more second On Durations.

Preferably, the DRX information and the indicator are received through either an RRC signaling or a MAC signaling.

Preferably, the indicator indicates at least one of: an $n^{th}$ second On Duration among the one or more first On Durations; $1^{st}$ to $n^{th}$ second On Durations among the one or more first On Durations; $n_x^{th}$, $n_y^{th}$, and $n_z^{th}$ second On Durations (where x, y, ..., z are consecutive) among the one or more first On Durations; $n_x^{th}$, $n_y^{th}$, and $n_z^{th}$ second On Durations (where x, y, ..., z are not consecutive) among the one or more first On Durations; or one or more second On Durations among the one or more first On Durations according to a specific pattern.

Preferably, the method further comprising, starting a timer on a first subframe in the one or more second On Durations.

Preferably, one or more third On Durations among the one or more first On Durations are not monitored based on the indicator, wherein the one or more third On Durations are different from the one or more second On Durations.

Preferably, when the timer expires on a last subframe in the one or more second On Durations, checking whether each subframe after the last subframe is a beginning of the second On Duration.

Preferably, when a second On Duration is a last one of the second On Durations to be used for the UE in the DRX cycle, ceasing said checking whether each subframe after the last subframe is a beginning of the second On Duration.

It is to be understood that both the foregoing general description and the following detailed description of the present invention are exemplary and explanatory and are intended to provide further explanation of the invention as claimed.

Advantageous Effects

According to the present invention, monitoring On Duration in a DRX operation can be efficiently performed in a wireless communication system. Specifically, when the UE receives an indicator for selecting On Duration to be used for the UE in a DRX operation, the UE can monitor the On Durations efficiently based on the indicator.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIG. 10 is a conceptual diagram for monitoring On Durations according to embodiments of the present invention;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
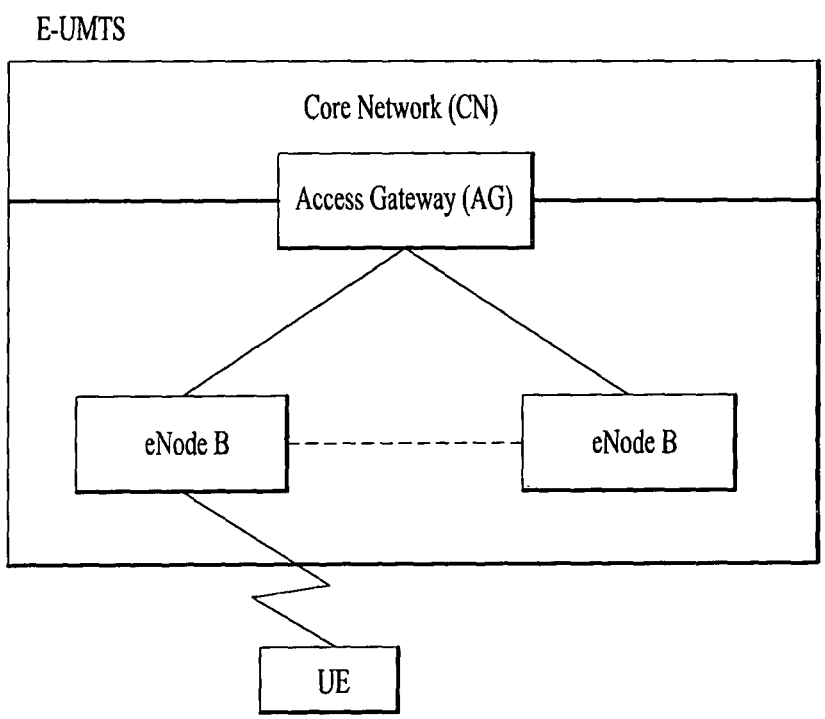
FIG. 1 is a diagram showing a network structure of an Evolved Universal Mobile Telecommunications System (E-UMTS) as an example of a wireless communication system.
Figure 2A:
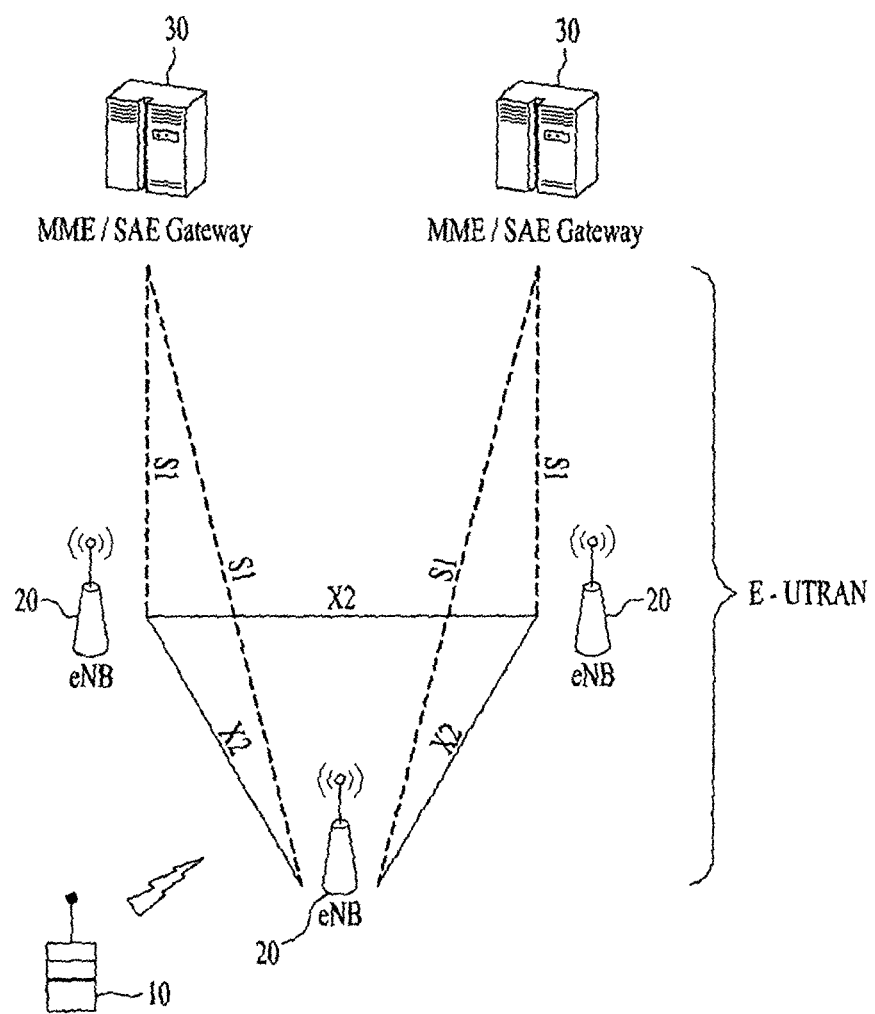
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
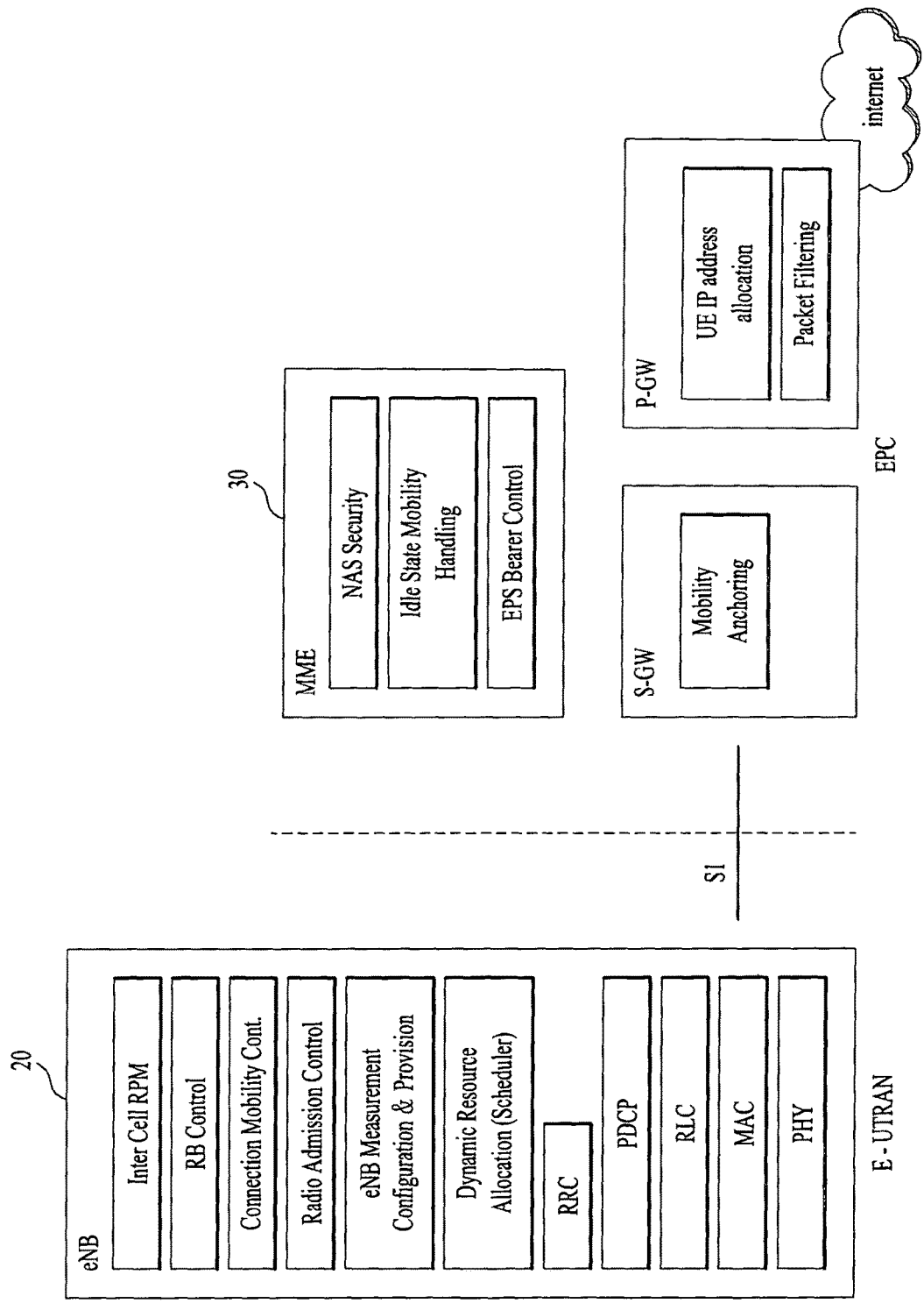
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
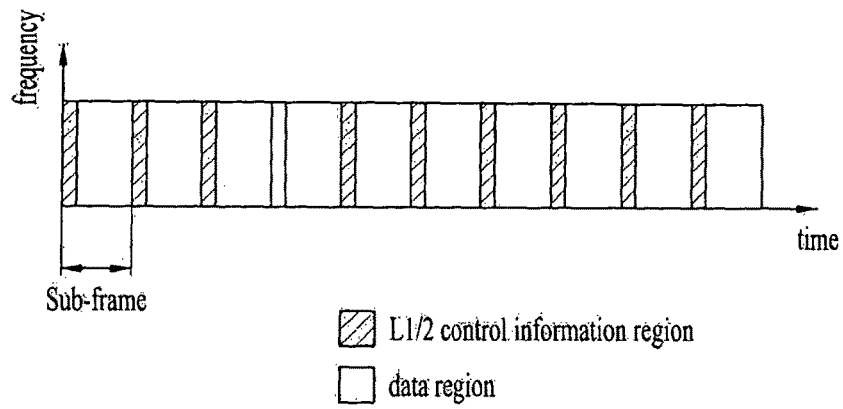
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
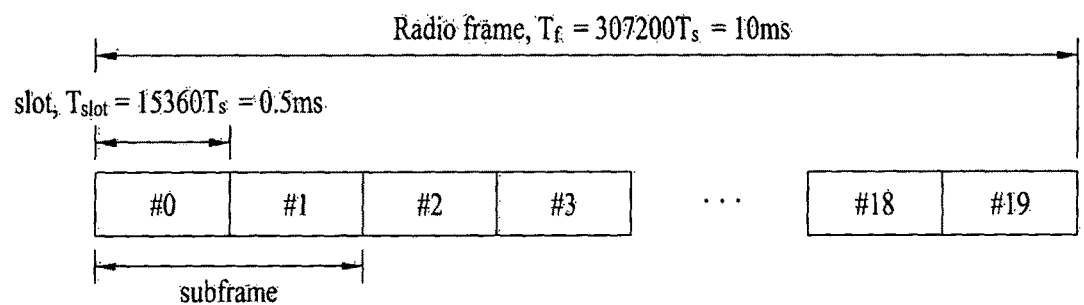
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10-8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Figure 6:
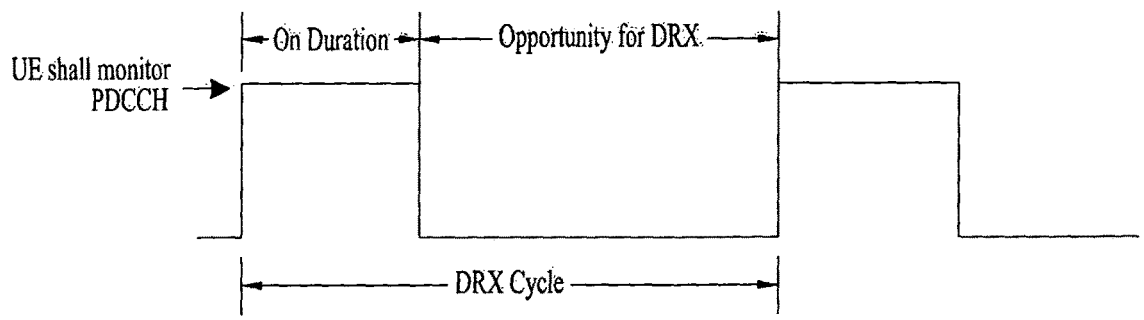
FIG. 6 is a diagram showing a concept DRX (Discontinuous Reception)

FIG. 6 is a diagram showing a concept DRX (Discontinuous Reception).

Referring to FIG. 6, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 7:
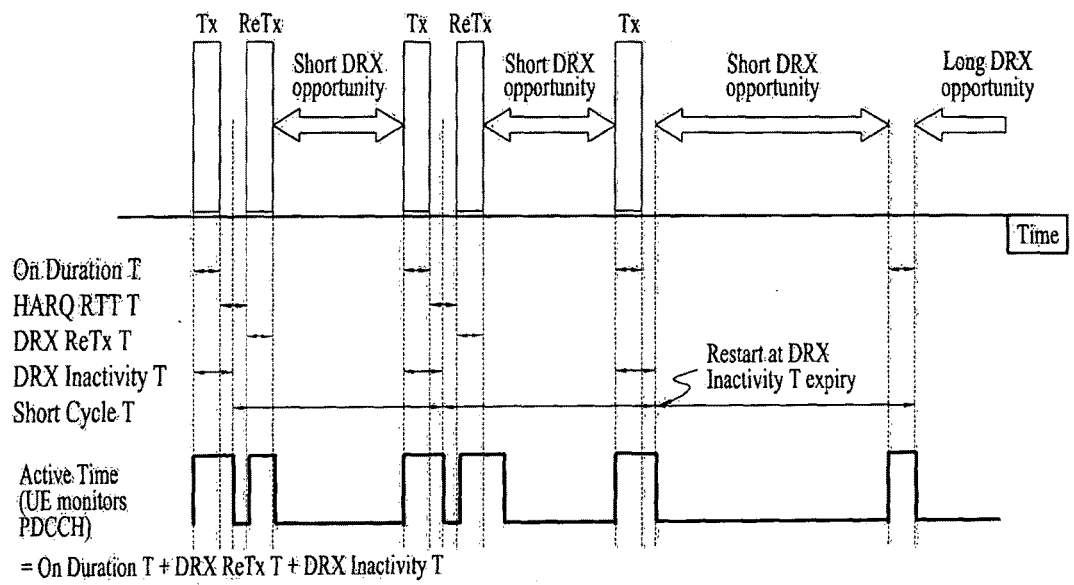
FIG. 7 is a diagram showing a method for a DRX operation in the LTE system.

FIG. 7 is a diagram showing a method for a DRX operation in the LTE system.

Referring to FIG. 7, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

Figure 8:
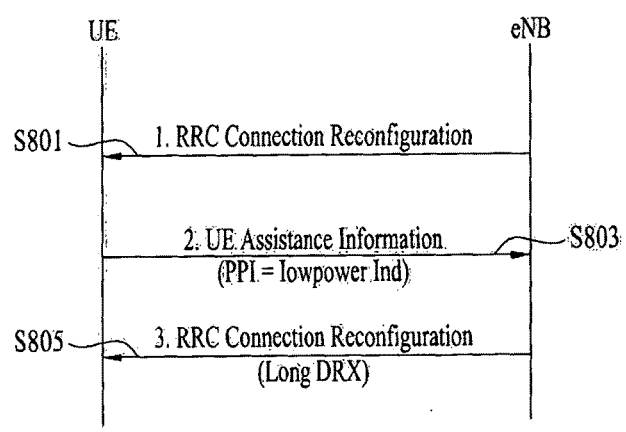
FIG. 8 is a diagram showing a method for a Long-DRX operation in the LTE system.

FIG. 8 is a diagram showing a method for a Long-DRX operation in the LTE system.

When the eNB wants the UE to be configured as the Long-DRX operation, the eNB sends RRC connection reconfiguration message to UE by enabling the power preference indicator (S801). This allows UE to be able to perform power preference indication procedure.

The UE decides to enter low power consumption mode. It sends the sends UE Assistance Information message to eNB with power preference indicator set to low power consumption (S803). The decision for UE initiating low power consumption mode may be based on the UE configuration by the network or UE implementation.

The eNB on receiving the UE assistance information provides UE with long DRX cycle in RRC Connection reconfiguration (S805). In RRC connection reconfiguration message there is 'MAC config IE' which includes the 'DRX config IE' which can be adjusted. Currently maximum value defined for DRX cycle length is 2.56 second. The eNB may assign maximum or higher DRX cycle to UE. Higher value of DRX cycle beyond 2.56 may be defined. Higher value of DRX cycle beyond 2.56 second requires analysis by 3GPP RAN WGs.

Figure 9A:
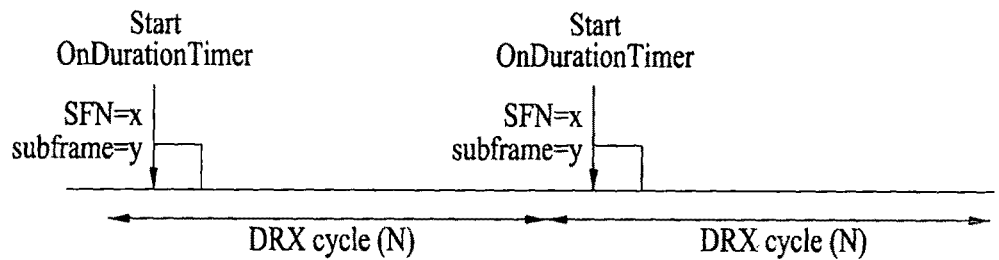
FIGS. 9A and 9B are diagrams showing exemplary one or multiple On Durations in the DRX cycle.
Figure 9B:
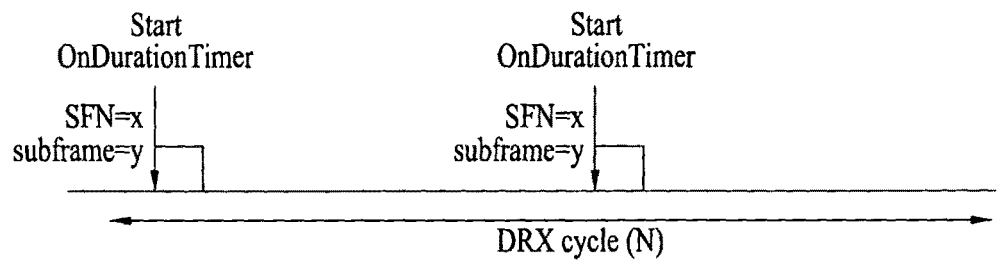

FIGS. 9A and 9B are diagrams showing exemplary one or multiple On Durations in the DRX cycle. In the current MAC specification, when DRX functionality is configured for the UE, the UE checks, in each subframe, whether to start onDurationTimer as follows:

If the Short DRX Cycle is used and [(SFN*10)+ subframe number] modulo (shortDRX-Cycle) is (drxStartOffset) modulo (shortDRX-Cycle), or If the Long DRX Cycle is used and [(SFN*10)+ subframe number] modulo (longDRX-Cycle) is drxStartOffset, the UE shall start onDuration-Timer. [Equation A]

According to the equation A (so-called, modulo-DRX Cycle check), the On Duration appears once per one DRX cycle because it is assumed that the length of DRX cycle is shorter than the maximum SFN value, i.e., the maximum SFN value is currently at most 1023, and the DRX cycle is at most 2560 subframes. If the DRX cycle is set to longer than the 'maximum SFN value*10', e.g., 10230 subframes, in order to further reduce the UE's power consumption, On Duration would appear several times within one DRX cycle.

Regarding FIG. 9A, the timer starts only one time per DRX cycle because the maximum x is higher than the DRX cycle N. However, in FIG. 9B, the UE starts the timer multiple times because the maximum x is less than the DRX cycle N.

In order to have one On Duration during one DRX cycle, it is straightforward to extend the maximum value of SFN so that the length of the DRX cycle is shorter than the maximum value of SFN. However, this approach requires additional bits to deliver the SFN. In addition, if further extension of DRX cycle is needed in the future, the maximum value of SFN would also be extended, which is undesirable in the sense of flexibility.

Conventionally, in the case that there could be multiple On Durations within one DRX cycle, there is no way that the UE selects at least one specific On Duration among multiple On Durations and starts the timer for the selected On Durations.

FIG. 10 is a conceptual diagram for monitoring On Durations according to embodiments of the present invention.

In this invention, it is proposed that the UE selects one or more specific On Durations among multiple On Duration candidates within one DRX cycle, monitors PDCCH signals on the selected On Duration and starts the timer for the selected On Durations.

Regarding FIG. 10, the UE may receive DRX information and an indicator for selecting On Durations to be used for the UE from the eNB (S1001). The DRX information and the indicator are transmitted through either a RRC signaling or a MAC signaling.

The DRX information may be used for deriving the multiple On Duration candidates in one DRX cycle. In each subframe, the UE may check whether the subframe is the beginning of the On Duration candidate. In this On Duration candidate checking, the UE uses pre-defined checking rule (e.g. modulo-DRX cycle checking) such as the Equation A.

The UE may calculate one or more On Duration candidates in a DRX cycle based on the DRX information (S1003). After the step of S1003, the UE may select one or more specific On Durations among the one or more On Durations candidates based on the indicator (S1005).

Desirably, each On Duration comprises one or more subframes.

The indicator may include a set of indicators indicating whether the On Duration candidates are specific On Durations to be monitored by the UE.

The indicator may indicate a specific On Duration as $n^{th}$ specific On Durations among the one or more On Duration candidates. The indicator may indicate specific On Durations as $1^{st}$ to $n^{th}$ specific On Durations among the one or more On Duration candidates. Or, the indicator may indicate specific On Durations as $n_x^{th}$, $n_y^{th}$, and $n_z^{th}$ specific POs (where x, y, . . . , z are consecutive or not consecutive) among the one or more On Duration candidates. Or, the indicator may indicate specific On Durations according to a specific pattern.

After the step of S1005, the UE may monitor the one or more specific On Durations among the one or more On Duration candidates based on the indicator (S1007). In the step of S1007, if an On Duration candidate is the specific On Duration to be used for the UE, the UE may monitor a PDCCH (Physical Downlink Control Channel) signal on the On Duration candidate. And the UE may start a timer on a first subframe in the specific On Durations (S1009).

If an On Duration candidate is not a specific On Duration to be used for the UE, the UE may not monitor PDCCH on the On Duration candidate. And the UE may not also start the timer on a first subframe in the specific On Durations.

When the timer expires on a last subframe in the specific On Durations, the UE may check whether a subframe after the last subframe is a beginning of next On Duration candidate. If the On Duration candidate is the last one of the On Durations to be used for the UE in the DRX cycle, the UE may stop to check whether the subframe after the last subframe is a beginning of the On Duration candidate.

When the UE monitors and detects the PDCCH signals for the UE on the specific On Duration among the one or more On Duration candidates based on the indicator, the UE may transmit or receive a data to/from the eNB (S1011).

Figure 11:
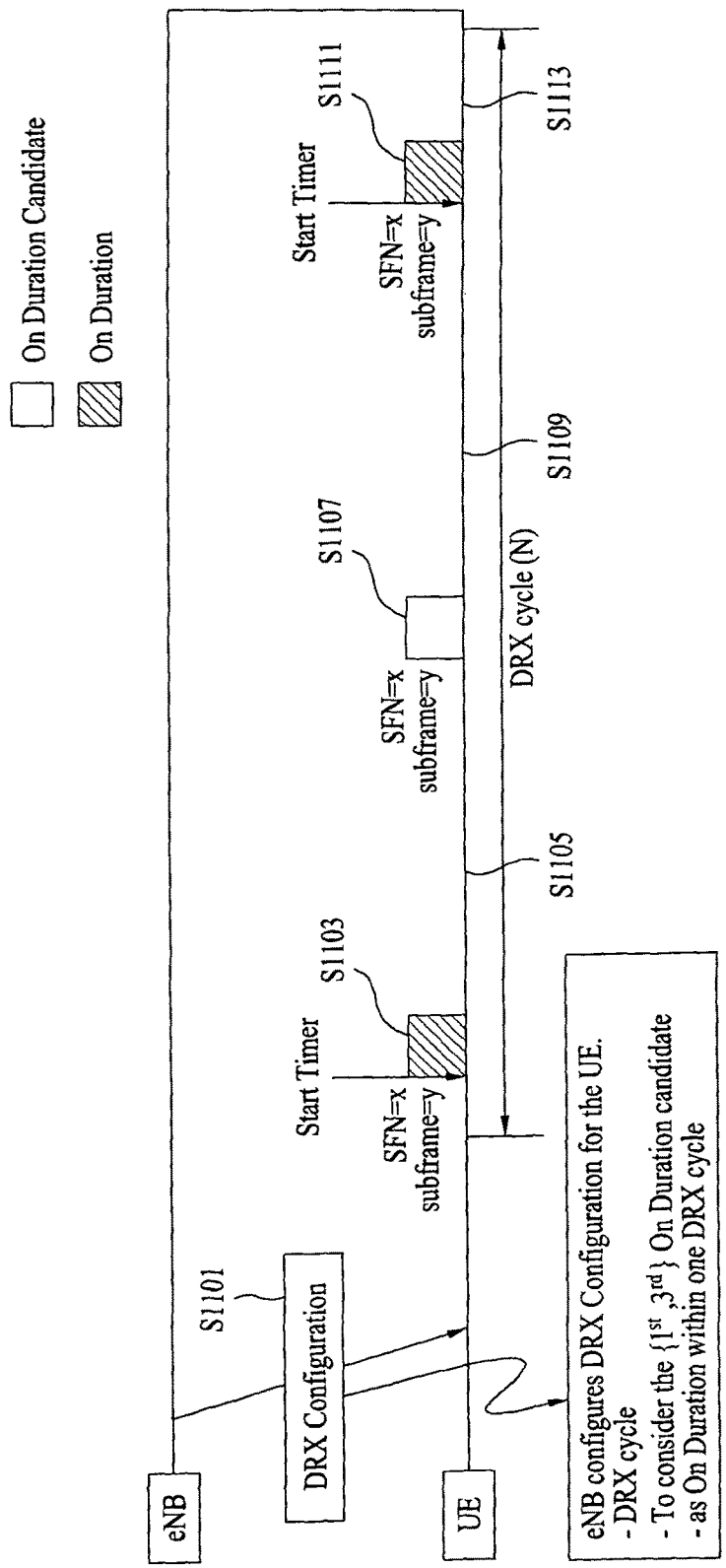
FIG. 11 is conceptual diagram an exemplary On Durations according to embodiments of the present invention.

FIG. 11 is conceptual diagram an exemplary On Durations according to embodiments of the present invention.

The UE is configured with DRX functionality by the eNB (S1101). In the step of S1101, the UE received DRX information and indicator from the eNB. The DRX information indicates that the DRX cycle is set to N. Using the indicator, the UE is configured to consider the $1^{st}$ and the $3^{rd}$ On Duration candidates as specific On Durations to be monitored by the UE within one DRX cycle.

When the number of SFN is x and the number of subframe is y, the UE may consider that it is On Duration candidate according to On Duration candidate checking. Since this is the $1^{st}$ On Duration candidate, the UE may start the timer according to the On Duration checking and monitor the $1^{st}$ On Duration (S1103).

After the $1^{st}$ On Duration, the UE may perform On Duration candidate checking in each subframe (S1105). Since it is not On Duration candidate according to the On Duration candidate checking, the UE considers that it is not On Duration.

When the number of SFN is x and the number of subframe is y again, the UE may consider that it is the On Duration candidate according to the On Duration candidate checking. Since this is the $2^{nd}$ On Duration candidate, the UE may not start the timer this time and may not monitor the $2^{nd}$ On Duration (S1107).

After the $2^{nd}$ On Duration, the UE performs On Duration candidate checking in each subframe. Since it is not On Duration candidate according to the On Duration candidate checking, the UE considers that it is not On Duration (S1109).

When the number of SFN is x and the number of subframe is y again, it is the On Duration candidate according to the On Duration candidate checking. Since this is the 3rd On Duration candidate, the UE may start the timer according to the On Duration checking and monitor the $3^{rd}$ On Duration similar to the step of S1103 (S1111).

If the 3rd On Duration is the last one of On Durations within the DRX cycle, after 3rd On Duration (S1111), the UE does not further perform the On Duration candidate checking (S1113).

Figure 12:
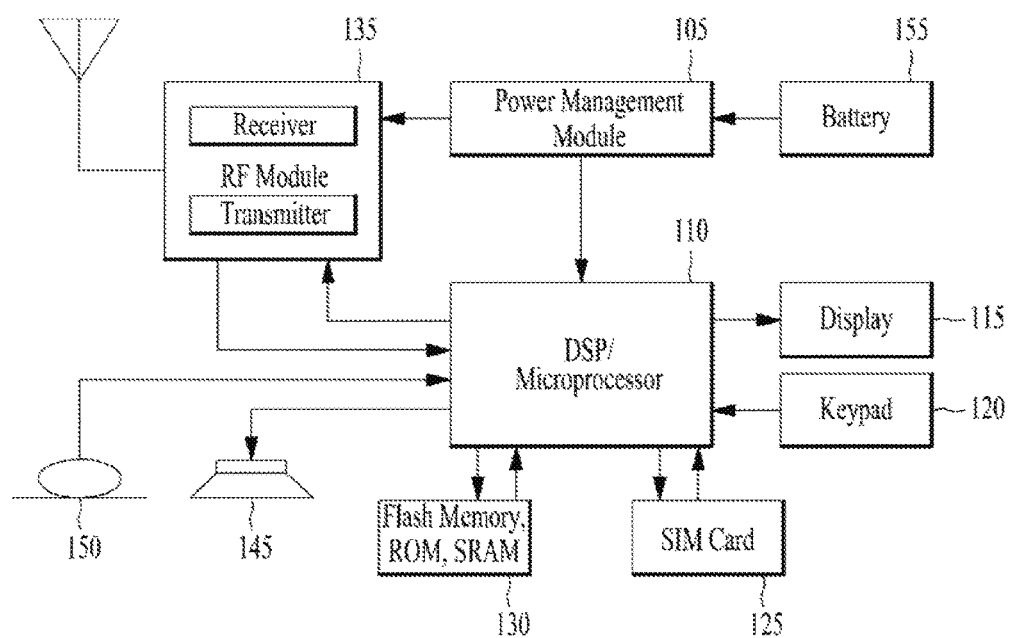
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 12 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable. Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
receiving DRX (Discontinuous Reception) information for configuring a DRX cycle and an indicator indicating one or more On Durations to be monitored by the UE, the DRX information indicating that the DRX cycle includes two or more On Duration candidates;
selecting one or more On Durations among the two or more On Duration candidates in a DRX cycle based on the indicator; and
monitoring a Physical Downlink Control Channel (PDCCH) signal in at least one subframe of the selected one or more On Durations.

2. The method according to claim 1, wherein each of the selected one or more On Durations comprises one or more subframes.

3. The method according to claim 1, wherein the DRX information and the indicator are received through either RRC (Radio Resource Control) signaling or MAC (Medium Access Control) signaling.

4. The method according to claim 1, wherein the indicator further indicates at least:
an $n^{th}$ On Duration among the two or more On Duration candidates where n is positive integer;
$1^{st}$ to $n^{th}$ On Durations among the two or more On Duration candidates;
$n_x^{th}$, $n_y^{th}$, and $n_z^{th}$ On Durations among the two or more On Duration candidates where x, y, . . . , z are consecutive;
$n_x^{th}$, $n_y^{th}$, and $n_z^{th}$ On Durations among the two or more On Duration candidates where x, y, . . . , z are not consecutive; or
one or more On Durations among the two or more On Duration candidates using a specific pattern.

5. The method according to claim 1, further comprising starting a timer on a first subframe of a first On Duration of the selected one or more On Durations.

6. The method according to claim 5, further comprising;
checking whether each subframe after a last subframe of the first On Duration is a first subframe of a second On Duration of the selected one or more On Durations when the timer expires on the last subframe of the first On Duration.

7. The method according to claim 6, wherein;
the UE stops checking whether each subframe after the last subframe is the first subframe of the second On Duration if the second On Duration is a last of the selected one or more On Durations in the DRX cycle.

8. The method according to claim 1, wherein:
the UE skips monitoring a PDCCH on unselected On Duration candidates among the two or more On Duration candidates.

9. A user equipment (UE) in a wireless communication system, the UE comprising:
an RF (radio frequency) module configured to transmit and receive information; and
a processor configured to:
control the RF module to receive DRX (Discontinuous Reception) information for configuring a DRX cycle and an indicator indicating one or more On Durations to be monitored by the UE, the DRX information indicating that the DRX cycle includes two or more On Duration candidates;
select one or more first On Durations among the two or more On Duration candidates in a DRX cycle based on the indicator; and
monitor a Physical Downlink Control Channel (PDCCH) signal in at least one subframe of the selected one or more On Durations.

10. The UE according to claim 9, wherein each of the selected one or more On Durations comprises one or more subframes.

11. The UE according to claim 9, wherein the DRX information and the indicator are received through either RRC (Radio Resource Control) signaling or MAC (Medium Access Control) signaling.

12. The UE according to claim 9, wherein the indicator further indicates at least:
an $n^{th}$ On Duration among the two or more On Duration candidates where n is positive integer;
$1^{st}$ to $n^{th}$ On Durations among the two or more On Duration candidates;
$n_x^{th}$, $n_y^{th}$, and $n_z^{th}$ On Durations) among the two or more On Duration candidates where x, y, . . . , z are consecutive;
$n_x^{th}$, $n_y^{th}$, and $n_z^{th}$ On Durations among the two or more On Duration candidates where x, y, . . . , z are not consecutive; or
one or more On Durations among the two or more On Duration candidates using a specific pattern.

13. The UE according to claim 9, wherein the processor is further configured to start a timer on a first subframe of a first On Duration of the selected one or more On Durations.

14. The UE according to claim 13, wherein the processor is further configured to check whether each subframe after a last subframe of the first On Duration is a first subframe of a second On Duration of the selected one or more On Durations when the timer expires on the last subframe of the first On Duration.

15. The UE according to claim 14, wherein the processor is further configured to stop checking whether each subframe after the last subframe is the first subframe of the second On Duration if the second On Duration is a last of the selected one or more On Durations in the DRX cycle.

16. The UE according to claim 9, wherein:
the processor is further configured to skip monitoring a PDCCH on unselected On Duration candidates among the two or more On Duration candidates.

* * * * *